United States Patent
Lange

(10) Patent No.: US 8,706,389 B2
(45) Date of Patent: Apr. 22, 2014

(54) RANGE- AND/OR CONSUMPTION CALCULATION WITH ENERGY COSTS ASSOCIATED WITH AREA SEGMENTS

(75) Inventor: Rainer Lange, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/988,422

(22) PCT Filed: Nov. 16, 2011

(86) PCT No.: PCT/EP2011/005769
§ 371 (c)(1),
(2), (4) Date: Jul. 29, 2013

(87) PCT Pub. No.: WO2012/065726
PCT Pub. Date: May 24, 2012

(65) Prior Publication Data
US 2013/0325310 A1 Dec. 5, 2013

(30) Foreign Application Priority Data
Nov. 18, 2010 (DE) .......................... 10 2010 051 546

(51) Int. Cl.
*G01C 21/30* (2006.01)
(52) U.S. Cl.
USPC .......................................... 701/123; 701/512
(58) Field of Classification Search
USPC .................................................. 701/123, 512
See application file for complete search history.

(56) References Cited

U.S. PATENT DOCUMENTS

| | | | |
|---|---|---|---|
| 5,487,002 A | 1/1996 | Diller et al. | |
| 5,539,399 A | 7/1996 | Takahira et al. | |
| 5,913,917 A | 6/1999 | Murphy | |
| 6,005,494 A | 12/1999 | Schramm | |
| 2006/0004515 A1* | 1/2006 | McDonough | ................. 701/208 |

FOREIGN PATENT DOCUMENTS

| | | |
|---|---|---|
| DE | 4344369 | 7/1995 |
| DE | 19519107 | 4/1996 |
| DE | 19749582 | 5/1999 |
| DE | 19929426 | 12/2000 |
| DE | 10146789 | 4/2003 |
| DE | 10306093 | 9/2003 |
| DE | 10302504 | 9/2004 |
| DE | 10335927 | 3/2005 |
| DE | 102005035624 | 2/2007 |
| DE | 102007037329 | 2/2008 |
| DE | 102007054738 | 5/2009 |
| DE | 102008037262 | 5/2009 |
| DE | 102007059120 | 6/2009 |
| DE | 102007059121 | 6/2009 |

(Continued)

OTHER PUBLICATIONS

Joost Van Bemmelen et al., "Vector vs. Raster-based Algorithms for Cross Country Movement Planning," Proceedings 11th International Symposium on Computer-Assisted Cartography (Auto-Carto-11), Oct./Nov. 1993, 14 pages.

(Continued)

*Primary Examiner* — Mary Cheung
*Assistant Examiner* — Yuen Wong
(74) *Attorney, Agent, or Firm* — Staas & Halsey LLP

(57) ABSTRACT

Energy costs which are assigned to area segments are used when calculating the range and/or consumption for a vehicle.

15 Claims, 5 Drawing Sheets

(56) References Cited

FOREIGN PATENT DOCUMENTS

| DE | 102009030784 | 2/2010 |
|----|--------------|--------|
| DE | 102010051546 | 11/2010 |
| EP | 1505370 | 2/2005 |
| EP | 2136182 | 12/2009 |
| EP | 2172740 | 4/2010 |
| WO | PCT/EP2011/005769 | 11/2011 |

OTHER PUBLICATIONS

E. W. Dijkstra, "A Note on Two Problems in Connexion with Graphs," Numerishe Mathematik 1, 1959, pp. 269-271.
English language translation of International Search Report for PCT/EP2011/005769, mailed on Feb. 22, 2012, 3 pages.
WIPO English language translation of International Preliminary Report on Patentability, issued May 18, 2013, 5 pages.

* cited by examiner

|   | V | W | X | Y | Z |
|---|---|---|---|---|---|
| A | 8 | 2 | 9 | 4 | 5 |
| B | 9 | 7 | 3 | 9 | 6 |
| C | 3 | 9 | 4 | 9 | 7 |
| D | 5 | 2 | 9 | 5 | 4 |
| E | 9 | 9 | 8 | 4 | 9 |

|   | V | W | X | Y | Z |
|---|---|---|---|---|---|
| A | 8 | 2 | 9 | 4 | 5 |
| B | 9 | 7 | 3 | 9 | 6 |
| C | 3 | 9 | 4 | 9 | 7 |
| D | 5 | 2 | 9 | 5 | 4 |
| E | 9 | 9 | 8 | 4 | 9 |

| 8 | 8 | 2 | 9 | 4 | 5 | 5 |
|---|---|---|---|---|---|---|
| 8 | 8 | 2 | 9 | 4 | 5 | 5 |
| 9 | 9 | 7 | 3 | 9 | 6 | 6 |
| 3 | 3 | 9 | 4 | 9 | 7 | 7 |
| 5 | 5 | 2 | 9 | 5 | 4 | 4 |
| 9 | 9 | 9 | 8 | 4 | 9 | |
| 9 | 9 | 9 | 8 | 4 | 9 | 9 |

Fig. 5

RANGE- AND/OR CONSUMPTION CALCULATION WITH ENERGY COSTS ASSOCIATED WITH AREA SEGMENTS

CROSS REFERENCE TO RELATED APPLICATIONS

This application is based on and hereby claims priority to International Application No. PCT/EP2011/005769 filed on Nov. 16, 2011 and German Application No. 10 2010 051 546.9 filed on Nov. 18, 2010, the contents of which are hereby incorporated by reference.

BACKGROUND

The invention relates to a calculation of range and/or consumption for a vehicle.

In order to graphically represent the residual range of a vehicle as an area for a given value of its energy store, a calculation of a multiplicity of possible routes is necessary. These calculations load the computing capacity to a very high degree insofar as they are carried out with the currently conventional methods.

DE 10 2007 059 120 A1 discloses a method for determining a route from a starting point to a destination, wherein a route which is optimized in terms of energy consumption is determined, for which purpose at least some of the elements of the map data which depicts a road traffic network and on the basis of which the route is determined are assigned energy consumption values which have an acceleration-dependent component.

DE 10 2007 037 329 A1 describes a method for determining an optimum driving strategy of a motor vehicle for a journey from a starting point to a destination. In this context, the determination of the optimum driving strategy comprises determining a route from a starting point to a destination. The driving strategy is optimized as a function of at least two parameters which are selected from the following group: attractiveness of the route, duration of journey, comfort, operating costs and safety. In addition, a motor vehicle display is described which represents in a combined form a deviation from a specific optimum of an operating state, in particular of an energy consumption operating state, of the vehicle, and a measure for improving the operating state.

DE 103 02 504 A1 relates to a method for determining the range of an electric vehicle in which vehicle-related, routes-related and/or environment-related information about the vehicle and a planned route or a route which is to be traveled on at the current time are acquired by a vehicle computer by suitable information collection devices and processed. For this purpose, these pieces of information are linked to one another before the start of and/or during the travel along a route and are evaluated in terms of a predefined vehicle mode of operation or variably changing vehicle mode of operation. Subsequently, the remaining range of the electric vehicle is calculated from this information and/or the evaluation result and is displayed in a display device.

SUMMARY

Taking this as a basis, one potential object is to calculate the range and/or consumption for a vehicle which is distinguished by a high level of efficiency together with sufficient accuracy.

The inventor developed a proposal based on the idea that the residual range depends, in particular, on the influencing variables of the driving behavior and the road conditions. The latter point is suitable for calculating in advance in the entire map region. The storage of specific information which describes the energy costs or outlay on energy in order to cope with a route, as part of navigation data, permits efficient and rapid calculation of the residual range.

Accordingly, energy costs which are assigned to area segments are used in a method for calculating the range and/or consumption for a vehicle. In contrast to customary navigation databases and the associated calculation methods in which distance costs and/or time costs are route-related, the energy costs are therefore area-related in the present method.

The energy costs are preferably energy costs which are necessary to travel with the vehicle through the area segment to which they are respectively assigned.

Depending on the embodiment of the calculation method, the energy costs are preferably dependent on or independent of the direction in which the vehicle travels through the area segment.

The energy costs have preferably been determined on the basis of costs assigned to roads, wherein the roads run through the area segments. In this respect, intersection points of roads with edges of the area segment through which they run are also preferably determined. The costs are then calculated, for example with a Dijkstra algorithm, in order to pass from one intersection point to other intersection points. The energy costs are then determined from these costs, for example by forming averages, which process can also be performed as a function of the direction.

The costs which are assigned to the roads are obtained, in particular, from measurement data and/or calculations and/or simulations in physical models.

The method is carried out, in particular, in a computing device of a motor vehicle and the results are used further for actuating a display device or the like.

The area segments are preferably rectangular, in particular in the form of tiles or parcels.

Further preferably, during the calculation a method is used in a way analogous to the Dijkstra algorithm. Accordingly, the range which is to be represented graphically in a map is acquired by expansion occurring from a first area segment, in which the vehicle is, for example, currently stopped, to a second area segment which adjoins the first area segment and to which the lowest energy costs of all the area segments adjoining the first area segment are assigned. In the case of energy costs which are dependent on the direction in which the vehicle travels through, the direction which results from the position of the first area segment with respect to the second area segment is preferably taken into account here.

In the next step, expansion occurs from the first and second area segments to a third area segment which adjoins the first area segment and to which the lowest energy costs after the second area segment of all the area segments adjoining the first area segment are assigned, or which adjoins the second area segment if lower energy costs are assigned in total to the first, second and third area segments than are assigned in total to the first area segment and the area segment to which the lowest energy costs after the second area segment of all the area segments adjoining the first area segment are assigned.

This method is continued iteratively for the next area segments.

Alternatively or additionally, the area segments can be expanded in a star shape and/or recursively in order to calculate the range and/or consumption.

The calculation of the range and/or consumption on an expansion path is preferably aborted if the sum of the energy costs of the area segments reaches or exceeds a predefined quantity of energy.

It is further preferred for the calculation of the range and/or consumption to be aborted overall if the sum of the energy costs of the area segments reaches or exceeds a predefined quantity of energy on a multiplicity of expansion paths, in particular every expansion path.

For an assumed graphic representation in the display of the vehicle, the edges of the total area which results from the area segments to which expansion occurred are preferably smoothed.

A device, in particular a navigation system, is configured to carry out a method of the type described above. For this purpose, the device is preferably a device for calculating overall energy values with an input and/or memory for receiving and/or storing energy costs assigned to area segments, and a processor for adding the energy costs assigned to area segments.

A method of the type described above can be carried out by a program product if it runs on a computer. A memory, in particular a database, an SD card, a DVD or a hard disk has energy values assigned to area segments.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 5 shows a recursive tile expansion;

DETAILED DESCRIPTION OF THE PREFERRED EMBODIMENT

Figures 1, 2:
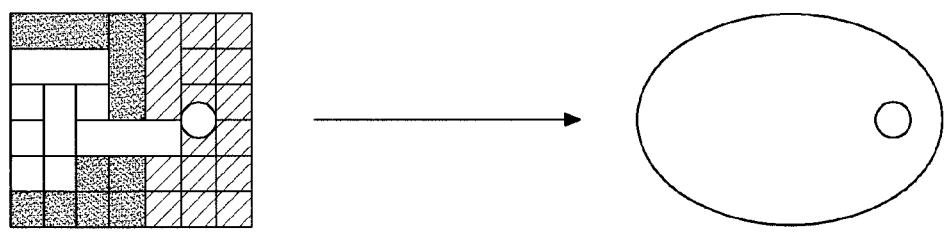
FIG. 1 shows an overview of a method for calculating the range and/or consumption and a display resulting therefrom.
FIG. 2 shows a first step of a tile expansion analogous to the Dijkstra algorithm.

Reference will now be made in detail to the preferred embodiments of the present invention, examples of which are illustrated in the accompanying drawings, wherein like reference numerals refer to like elements throughout.

Digital maps are typically broken down into area segments in the form of rectangular tiles. In order to increase the efficiency of a method for calculating the range and/or consumption for a vehicle, the energy costs are calculated in advance for each area segment and assigned to the respective area segment. This makes the actual calculation of the range and/or consumption significantly less calculation-intensive since, during the calculation in the vehicle, it is possible to have recourse to the energy costs for the respective area segments which were calculated in advance and stored in a database.

FIG. 1 shows a multiplicity of area segments in the form of tiles. The area segments are assigned different energy costs here, wherein the highest energy costs are assigned to the hatched area segments, medium energy costs are assigned to the dotted area segments and the lowest energy costs are assigned to the area segments which are not marked. The different energy costs result, for example, from different road conditions which can be caused by gradients, speed limits and/or regular traffic jams. The area segments are rectangular and have different sizes in order to permit efficient calculation of long cross-country sections of routes as well as precise calculation of areas with a multiplicity of different roads.

According to the energy costs of the area segments illustrated on the left in FIG. 1, there results the display of a direction-related residual range illustrated on the right in FIG. 1.

FIG. 2 illustrates a multiplicity of area segments AV to EZ. The area segments are respectively assigned energy costs which are expressed by a number for the respective area segment. The vehicle is located in the center on the area segment CX. The quantity of energy predefined by a residual energy is 15. In a first expansion step, potential area segments are found for expansion, said segments adjoining the area segment CX. These are the area segments BW, BX, BY, CW, CY, DW, DX and DY. The area segment with the lowest energy, which is the area segment DW, is searched from these area segments adjacent to the area segment CX, because the addition of the assigned energy costs 4+2 yields the lowest level.

In the next step (illustrated in FIG. 3), an expansion tree is now obtained without the area segment DW and additionally with the area segments CV, DV, EV, EW and EX. The search for an adjoining area segment with the lowest cumulative energy leads to the area segment BX because the sum of the energy costs 4+3 has the lowest level.

The method is continued until the energy which is predefined by the energy level 15 is consumed.

Figures 3, 4:
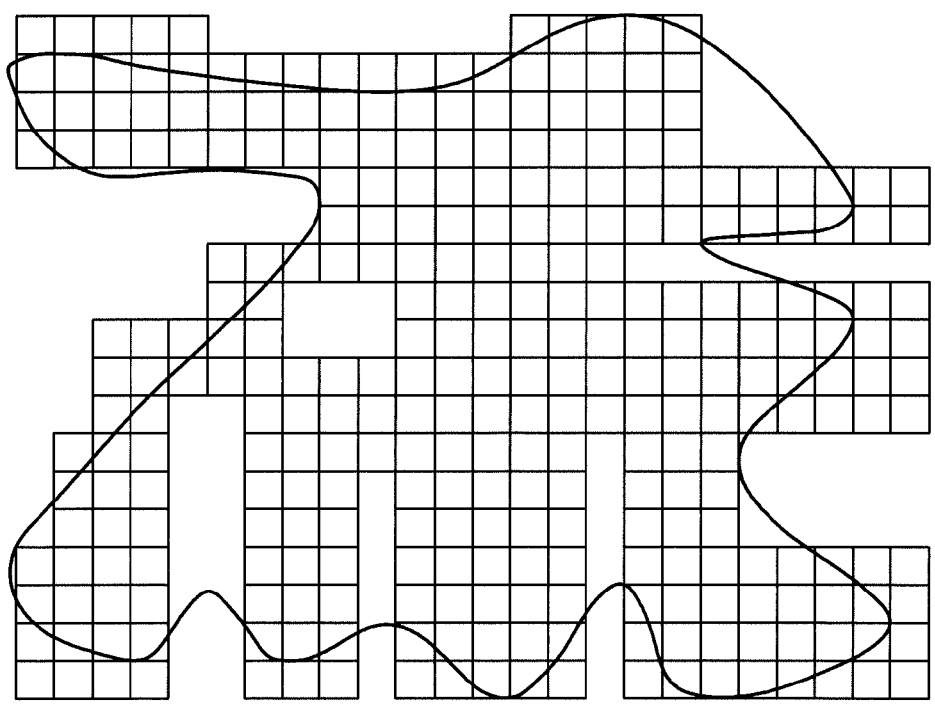
FIG. 3 shows a second step of a tile expansion analogous to the Dijkstra algorithm.
FIG. 4 shows smoothing of a calculation result.

Finally, as is also illustrated in FIG. 4, a smoothing function in the form of a spline or a similar smoothing operation for visually improving the illustration is applied.

FIG. 5 illustrates a recursive method for expanding area segments. The expansion is calculated here recursively until the quantity of energy predefined by the energy level is reached, said quantity of energy having the value 18 in FIG. 5. It is possible for all the marked area segments to be reached proceeding from the central area segment here. A smoothing method can also be used here. A diagonal expansion or restriction to a vertical/horizontal expansion is possible.

In summary, a road network is abstracted into area segments (polygons, in particular rectangles). The area segments are converted into a simplified network and, for example, Dijkstra algorithms are applied thereto. The result has meaning for the road network since, for example, statements are made as to how far the vehicle can travel on the roads. These statements relate here to traveling on the roads by virtue of the back transformation of the area segments onto the roads.

FIGS. 6 to 9 describe a particularly preferred way of determining the energy costs per area segment.

To do this, all the intersection points of roads with boundaries (edges) of the area segment are calculated, and then, for example, classic Dijkstra methods are used to calculate the costs to pass from one intersection point to all the other intersection points. This is carried out for each intersection point.

Figure 6:
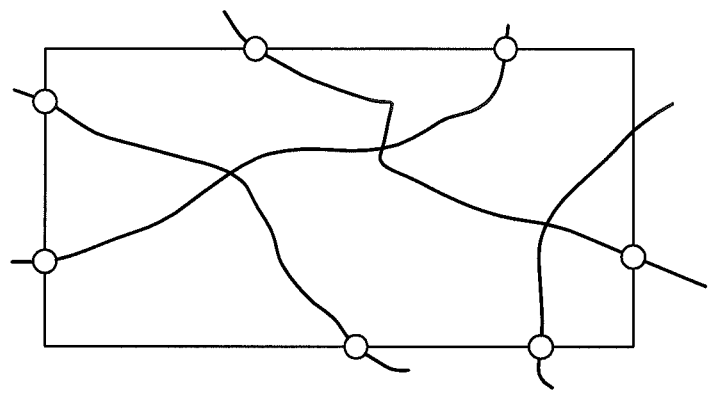
FIG. 6 shows the determination of intersection points of roads or routes with edges of an area segment in the form of a tile.

FIG. 6 shows in this respect the determination of intersection points of roads or routes with the edges of an area segment in the form of a tile in the shape of a rectangle.

Figure 7:
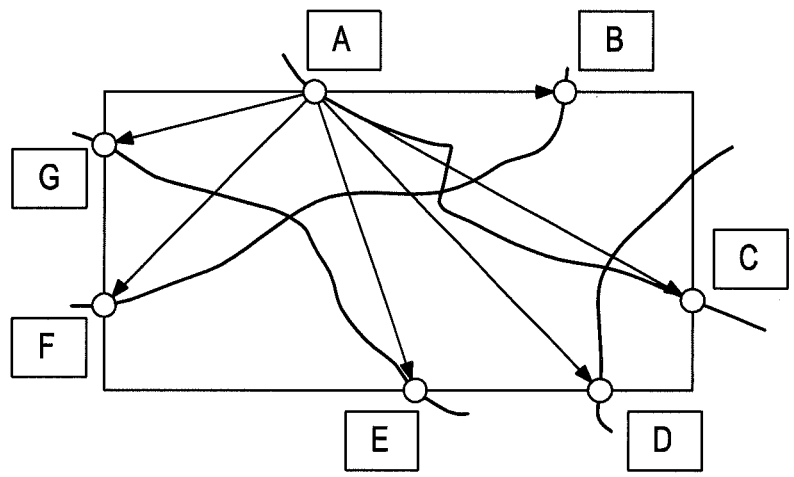
FIG. 7 shows the determination of routes between the intersection points.

FIG. 7 shows the determination of routes between the intersection points A to G. In the example shown, the costs obtained for this are:

A-B: Costs 22
A-C: Costs 25
A-D: Costs 27
A-E: Costs 25
A-F: Costs 18
A-G: Costs 17
B-C: Costs 28
...
G-F: Costs 12

In a subsequent step, the costs are determined for each direction in which the vehicle travels through. For this purpose, when there are a plurality of routes present for each direction in which the vehicle travels through, different approaches are possible:

forming an average value or a weighted average value,
representing different values by a distribution, in particular a Gaussian curve,
selecting, for example, the lowest costs, the shortest distance, the shortest travel time and/or the smallest difference in altitude on the basis of a route with a minimum value or a maximum value.

Figure 8:
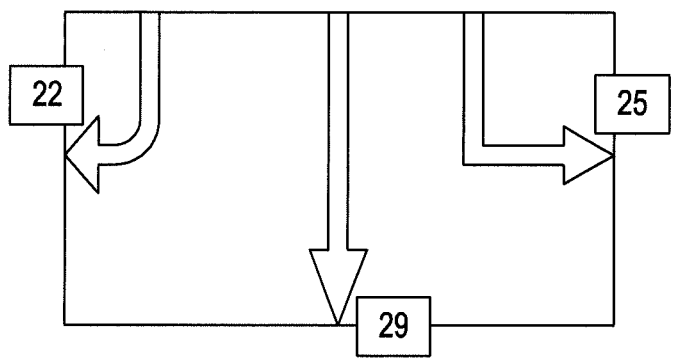
FIG. 8 shows the determination of energy costs per direction in which the vehicle travels through, and FIG. 9 shows an illustration of driving-in and driving-out directions for the area segment in the form of a tile.

FIG. 8 illustrates the determination of energy costs per direction in which the vehicle travels through by average values. This results in the average of north to east (routes A-B, A-C, B-C) as 22+25+28=75/3=25.

Figure 9:
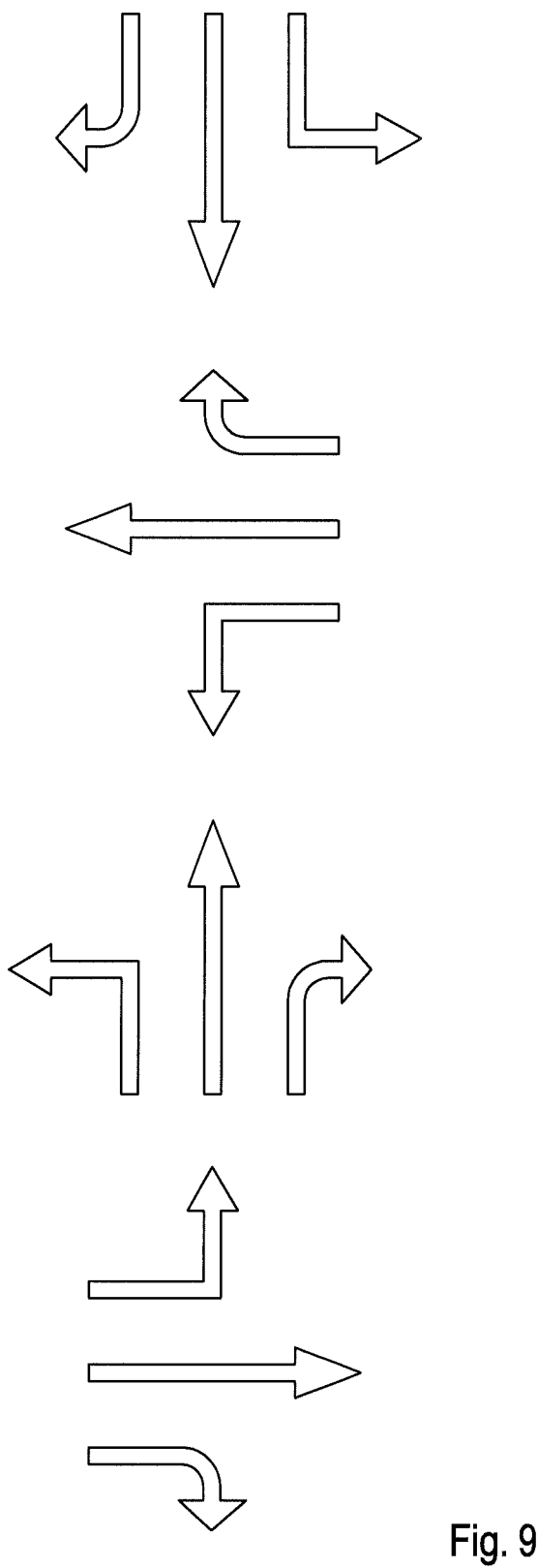

According to FIG. 9, the calculation is repeated for all the directions, that is to say:

costs from north to east, south, west,
costs from south to east, west, north,
costs from west to north, south, east, and
costs from east to south, west, north.

Overall, 3×4=12 cost values of the energy costs are obtained for all the directions of travel through the tile. These values are used, as described above, as an abstraction of the road network for the expansion.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method comprising:
   dividing a digitally represented map into area segments, the area segments being rectangular tiles having different sizes; and
   calculating, using a processor, a range and/or consumption for a vehicle by assigning energy costs, with an energy cost being assigned to each area segment.

2. The method as claimed in claim 1, wherein larger tiles are used to represent cross-country routes, and smaller tiles are used to represent areas having a plurality of different roads.

3. The method as claimed in claim 1, wherein the energy costs are energy costs which are incurred when traveling with the vehicle through the area segments.

4. The method as claimed in claim 3, wherein the energy costs are dependent on a direction in which the vehicle travels through the area segments.

5. The method as claimed in claim 3, wherein the energy costs are independent of a direction in which the vehicle travels through the area segments.

6. The method as claimed in claim 1, wherein the energy costs are determined based on costs assigned to roads.

7. The method as claimed in claim 3, wherein calculating the range and/or consumption comprises:
   starting with a range corresponding to a first area segment; and
   expanding the range from the first area segment to a second area segment which adjoins the first area segment and which has a lowest assigned energy cost of all the area segments adjoining the first area segment.

8. The method as claimed in claim 7, wherein calculating the range and/or consumption further comprises expanding from the first area segment and second area segment to a third area segment which adjoins the first area segment and which has the lowest assigned energy cost after the second area segment of all the area segments adjoining the first area segment, or which adjoins the second area segment if lower energy costs are assigned in total to the first, second and third area segments than are assigned in total to the first area segment and the area segment which has the lowest assigned energy cost after the second area segment of all the area segments adjoining the first area segment.

9. The method as claimed in claim 1, wherein the first area segment corresponds to a current position of the vehicle.

10. The method as claimed in claim 1, wherein calculating the range and/or consumption comprises:
    starting with a range corresponding to a first area segment; and
    expanding the range from the first area segment to other area segments,
    wherein the area segments are expanded in a star shape and/or recursively in order to calculate the range and/or consumption.

11. The method as claimed in claim 1, wherein calculating the range and/or consumption comprises:
    starting with a range corresponding to a first area segment; and
    expanding the range from the first area segment to other area segments on expansion paths extending from the first area segment,
    wherein calculating the range and/or consumption on a current expansion path is aborted if a sum of the energy costs of the area segments on the current expansion path reaches or exceeds a predefined quantity of energy.

12. The method as claimed in claim 1, wherein calculating the range and/or consumption comprises:
    starting with a range corresponding to a first area segment; and
    expanding the range from the first area segment to other area segments on expansion paths extending from the first area segment,
    wherein calculating the range and/or consumption is aborted if a sum of the energy costs of the area segments to which expansion occurred reaches or exceeds a predefined quantity of energy on every expansion path.

13. The method as claimed in claim 12, wherein a total range area is set with a contour having smoothed edges about the area segments to which expansion has occurred.

14. A navigation system for a vehicle, comprising:
    a route formulating device;
    a digitally represented map; and
    a calculation unit to divide the digitally represented map into area segments, the area segments being rectangular tiles having different sizes, and to calculate a range and/or consumption for the vehicle by assigning an energy cost to each area segment.

15. A non-transitory computer readable storage medium storing a computer program that causes a computer to perform a method comprising:

dividing a digitally represented map into area segments, the area segments being rectangular tiles having different sizes; and calculating a range and/or consumption for a vehicle by assigning an energy cost to each area segment.

* * * * *

UNITED STATES PATENT AND TRADEMARK OFFICE
CERTIFICATE OF CORRECTION

| | | |
|---|---|---|
| PATENT NO. | : 8,706,389 B2 | Page 1 of 1 |
| APPLICATION NO. | : 13/988422 | |
| DATED | : April 22, 2014 | |
| INVENTOR(S) | : Lange | |

It is certified that error appears in the above-identified patent and that said Letters Patent is hereby corrected as shown below:

In the Claims

Column 6, Line 1, in Claim 7, delete "claim 3," and insert -- claim 1, --, therefor.

Signed and Sealed this
Twenty-third Day of September, 2014

Michelle K. Lee
*Deputy Director of the United States Patent and Trademark Office*